United States Patent [19]

Ceska

[11] 3,886,081

[45] May 27, 1975

[54] AQUEOUS BROMINE EMULSIONS

[75] Inventor: Gary W. Ceska, Coraopolis, Pa.

[73] Assignee: ARCO Polymers, Inc., Glenolden, Pa.

[22] Filed: Dec. 6, 1972

[21] Appl. No.: 312,634

[52] U.S. Cl............ 252/182; 252/313 R; 252/187 R
[51] Int. Cl.............................................. C09k 3/00
[58] Field of Search................. 252/182, 441, 313 R

[56] References Cited
UNITED STATES PATENTS

| | | | |
|---|---|---|---|
| 3,353,916 | 11/1967 | Lester | 252/441 X |
| 3,484,494 | 12/1969 | Carson | 252/441 X |
| 3,553,151 | 1/1971 | Giannetti et al. | 252/441 X |
| 3,567,796 | 3/1971 | Estes et al. | 252/441 X |
| 3,607,959 | 9/1971 | Estes et al. | 252/441 X |

Primary Examiner—Stephen J. Lechert, Jr.
Attorney, Agent, or Firm—Lewis J. Young

[57] ABSTRACT

Novel emulsions of bromine in water have been prepared containing up to 30% bromine by weight. These emulsions are especially useful in bromination reactions with aqueous polymer latexes where molecular bromine cannot be used and bromine water (1–2% bromine) is too dilute to be efficient.

2 Claims, No Drawings

3,886,081

AQUEOUS BROMINE EMULSIONS

BACKGROUND OF THE INVENTION

This invention relates to a novel emulsion of bromine in water which is an efficient reagent for the bromination of unsaturated organic polymers in latex form.

It is known to brominate, for example, styrene-butadiene copolymer rubbers with molecular bromine. However, the addition of molecular bromine to aqueous latex of styrene-butadiene causes a drastic reduction in the pH of the latex. This reduction of pH more often than not leads to coagulation of the latex if more than about 5% bromine is added.

It is also known to use solutions of bromine in water to brominate styrene-butadiene latexes. Bromine is only soluble in water to about 2–4% by weight at room temperature and bromine water is normally 1–2% bromine in water. Thus, if a 50% solids latex is brominated by adding 5 g. of bromine, the latex is diluted to about 16% solids if bromine water is used. The dilution makes the resulting latex too dilute to be of practical use for most subsequent applications. The problem is enhanced as higher percentages of bromine are added.

It is also known that the solubility of bromine in water at room temperature can be greatly enhanced by the addition of a salt, such as sodium or potassium bromide. However, to form a solution of 30 g. of bromine in 100 g. of water, one must add about 17 g. of potassium bromide or 22 g. of sodium bromide. Any attempt to brominate rubbery latexes with a solution containing 17–22% of an electrolyte such as these salts are, would certainly result in coagulation of the latex.

SUMMARY OF THE INVENTION

It has now been found that an emulsion of as much as 30% by weight of bromine in water can be prepared using about 2–4% of an anionic surfactant as emulsifier. The resulting bromine emulsion is relatively stable, that is there is no separation of the phases on standing for at least 30 minutes. The emulsion is subject to hydrolysis of the bromine if allowed to stand for extended periods so the emulsion is preferably made fresh before each use.

DETAILED DESCRIPTION OF THE INVENTION

The bromine emulsions of the invention are prepared by adding bromine to water containing a suitable emulsifier system. The bromine is added to the aqueous solution of surfactants with mechanical agitation to disperse the bromine. The final emulsion is a light brown color. Although the emulsion is quite stable, the agitation should be continued to ensure complete emulsion up to the time of addition of the bromine to the desired reaction mixture. The bromine emulsion should be made fresh for each application because of the possibility of hydrolysis of the bromine in the aqueous medium.

Especially suitable surfactants for the preparation of the bromine emulsions are the commercially available anionic surfactants such as alkyl aryl sulfonates, organo phosphate esters, sulfated esters of fatty acids, sodium dodecyl diphenyl ether disulfonates, dialkyl esters of succinic acid, and dialkylsulfosuccinates. The anionic surfactants are preferably used in amounts between 2 and 4 per cent by weight of the emulsion. Greater than 4 per cent of the surfactant may be used, but it is desirable to keep the amount of surfactant to a minimum to minimize the impurities added to a subsequent reaction mixture. This is especially true when the emulsion is to be used to brominate polymer latexes.

Non-ionic surfactants may be effective to stabilize the emulsions if used at concentrations greater than 4 per cent, but these have been found to be ineffective at the 3 per cent level. Thus, at 3 per cent by weight surfactant, attempts to prepare emulsions of bromine using poly oxyethylene lauryl ethers having hydrophile-lypophile balance (HLB) numbers of 4.9, 9.5, and 15.7, all resulted in separation of the phases immediately after the agitation was stopped.

The emulsions of this invention preferably contain 15 to 30 per cent by weight of bromine in the water which contains the 2–4 per cent of anionic surfactant. Any amount of bromine less than the preferred range could obviously be used. However, the use of lower concentrations involves the addition of more water to the bromination reaction than is necessary. Amounts of bromine greater than about 30 per cent may be emulsified if desired, but this would require the use of greater than 4 per cent of the surfactant. In the case of bromination of latex, the addition of more surfactant than absolutely necessary is undesirable, since the latex already has some surfactant of its own prior to bromination.

The bromine emulsions of this invention are efficient reagents for most brominations which occur in aqueous medium. The bromination of most aliphatic olefin hydrocarbons can be carried out with this system. Systems for which the emulsions are especially useful, are those involving the bromination of rubbery polymeric latexes such as polybutadiene latexes, styrene-butadiene latexes acrylonitrile-butadiene-styrene (ABS) latexes and the like. These latexes have residual unsaturation in the polymers due to the polymerization of the conjugated diolefins into the mixture. The emulsions of this invention provide a convenient method of brominating the residual unsaturation of the latexes without either coagulating the latex (as does molecular bromine) or unduly diluting the latex (as do bromine water solutions).

The invention is further illustrated by the following examples, in which all parts are parts by weight.

EXAMPLE I

To a glass-lined reactor equipped with an efficient agitator was added 80 parts of water containing 2.2 parts of sodium dodecylbenzenesulfonate and 0.8 part of sodium dihexylsulfosuccinate as emulsifiers. The agitator was then turned on and 26 parts of bromine was added. The mixture was agitated to disperse the bromine and form an emulsion having a density of 1.2 g/ml. and containing 23.8% by weight bromine. The emulsion was kept under constant agitation until used in subsequent brominations, although the emulsion was stable for about 30 minutes without agitation. Because the emulsion is subject to hydrolysis of the bromine in the aqueous medium, only that amount of emulsion which was to be used in one day was prepared at one time.

EXAMPLE II

A 100 g. sample of a latex comprising a copolymer of styrene-butadiene-acrylic acid (59.4–39. 6–1.0) and having 52.5% solids and a pH of 3.0 was placed in each of 6 glass-lined reactors. To each reactor was added a portion of the bromine emulsion from Example I as rapidly as the bromine could react as indicated by the disappearance of the bromine color. The amount of emulsion added to each reactor was calculated from the amount of bromine desired in the polymer assuming quantitative bromination occurred. The results are shown in Table I. Runs 5 and 6, with higher bromine content, were buffered with about 2% of diammonium phosphate to prevent coagulation due to pH instability.

Table I

| Run No. | Control | 1 | 2 | 3 | 4 | 5 | 6 |
|---|---|---|---|---|---|---|---|
| % bromine in polymer | | | | | | | |
| Calculated | — | 5.3 | 9.5 | 13.5 | 17.5 | 23.2 | 36.3 |
| Analyzed | — | 6.8 | 9.7 | 13.3 | 17.0 | 21.0 | 32.5 |
| % solids in latex | 52.5 | 49 | 47 | 45.5 | 44 | 42 | 36. |

Although the addition of the bromine emulsion did dilute the latexes to some extent, the per cent solids can be raised to that of the initial latex by stripping off the excess water if desired.

It is important to note that if a 2% bromine water solution had been used to obtain the 32.5% brominated latex of Run 6, the resulting per cent solids would have been about 6% rather than the 36% obtained.

Attempts to prepare even the 6.8% brominated latex of Run 1 by the addition of molecular bromine, caused coagulation of the latex.

What is claimed is:

1. An emulsion of from 15 to 30% bromine in water containing a stabilizer comprising 2 to 4% of an anionic surfactant selected from the group consisting of alkyl aryl sulfonates, organo phosphate esters, sulfated esters of fatty acids, sodium dodecyl diphenyl ether disulfonates, dialkyl esters of succinic acid, and dialkylsulfosuccinates and mixtures thereof.

2. The emulsion of claim 1 comprising 23.8% bromine in water containing as surfactant a mixture of 2.2% of sodium dodecylbenzenesulfonate and 0.8% of sodium dihexylsulfosuccinate.

* * * * *